L. W. GREVE.
VALVE.
APPLICATION FILED NOV. 26, 1920.

1,425,644.

Patented Aug. 15, 1922.

Inventor
Louis W. Greve.

by
Thurston Knox & Hudson
attys

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

VALVE.

1,425,644.    Specification of Letters Patent.    Patented Aug. 15, 1922.

Application filed November 26, 1920. Serial No. 426,408.

*To all whom it may concern:*

Be it known that I, LOUIS W. GREVE, a citizen of the United States, residing at Cleveland, in the county of Cuyahoga and State of Ohio, have invented a certain new and useful Improvement in Valves, of which the following is a full, clear, and exact description.

This invention relates to valves, and especially to plural way valves such as three and four-way valves, and has for its object to provide certain improvements which simplify the construction of valves of this character.

Further the invention aims to provide not only a simple but a highly efficient valve with an inlet connection in line with the axis of the movable valve member, with novel provision in the movable valve member for exhausting fluid pressure from one outlet or line leading to the valve body either while the valve at the same time supplies fluid pressure to another outlet as in the case of a four-way valve, or is turned to neutral position so as to shut off the flow of the fluid being transmitted as in the case of a three-way valve.

The invention may be briefly summarized as consisting in certain novel details of construction and combinations and arrangements of parts which will be described in the specification and set forth in the appended claims.

Figure 1:
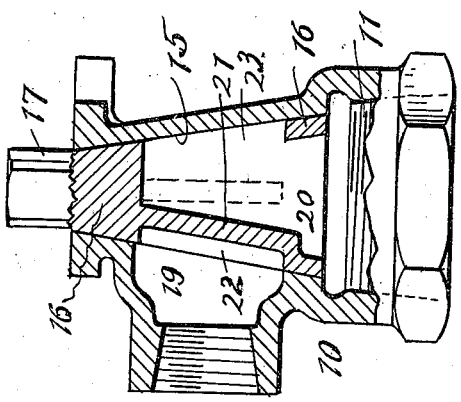
Figure 2:
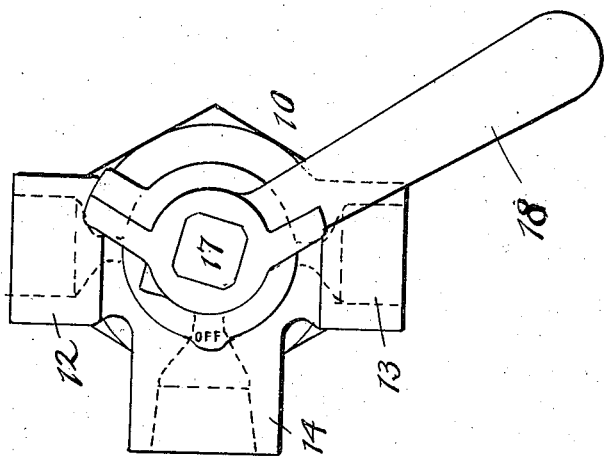
Figure 3:
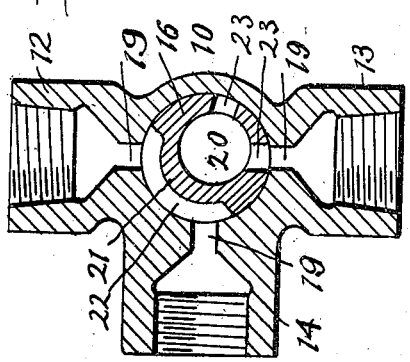
Figure 4:
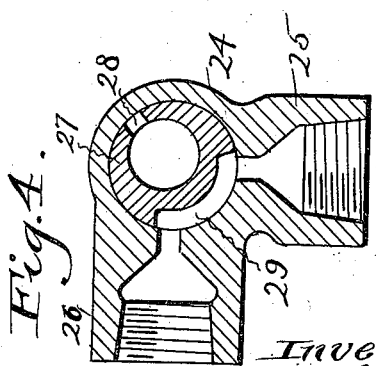

In the drawings, Fig. 1 is a vertical sectional view of a valve embodying my invention; Fig. 2 is a view looking toward one end of the valve of Fig. 1, the valve here shown being of the four-way type; Fig. 3 is a transverse sectional view through the four-way valve; and Fig. 4 is a similar view of a valve of the three-way type.

Referring now to the drawings, 10 represents the valve body. This valve body has an inlet end 11 which extends axially of the valve, and it has a number of laterally disposed outlets which in the case of a four-way valve are three in number, these being designated in Figs. 2 and 3 as 12, 13 and 14. As will subsequently appear, the middle outlet 14 is an exhaust outlet and the other two outlets 12 and 13 are adapted to be connected to the parts or machines to which air or other motive fluid is to be delivered. These outlets 12 and 13 and the inlet 11 may be formed in any suitable manner to receive hose or pipes for the delivery of motive fluid, but as here shown, they are threaded, though threaded hose or pipe connections are not necessary, as other forms of connections may be used, such as quick detachable couplings.

In line with the inlet 11 there is a tapered valve seat 15 which accommodates with a sliding fit, a tapered hollow valve member 16, whose large end is toward the inlet 11, so that the pressure of the fluid will at all times tend to seat the valve, and so that wear on the valve or its seat will be fully compensated for, and liability of looseness due to wear is avoided. The small end of the valve has a reduced portion 17 which projects through the valve body directly opposite the inlet 11, and this portion is shaped to accommodate a suitable valve turning handle such as shown at 18 in Fig. 2.

In the wall of the valve body and intersecting the tapered seat 15 are narrow elongated ports 19 which lead to the several outlets 12, 13 and 14. These elongated ports 19 are adapted to be covered by the tapered valve, or to be uncovered and placed in communication with ports or passageways in the valve 16.

The valve 16, as before stated, is hollow, as it is provided with a chamber or opening 20, largest toward the inlet end of the valve and gradually reducing in size as it extends toward the relatively small end of the valve, this chamber opening being eccentrically disposed or offset with respect to the center of the valve, except at the inlet or large end of the valve where it is concentric. The eccentricity is formed by an inset arc-shaped wall 21 which forms exteriorly of the valve chamber 20, and on the surface of the valve member, an exhaust space or passageway 22. Likewise the valve 16 has opposite this inset wall 21 a pair of narrow elongated ports 23, one of which is adapted to be placed in registration with the port 19 communicating with the outlet 12, and the other adapted to be placed in registration with the port 19 communicating with the outlet 13. I might here state that it is not essential that two separate ports 23 be utilized, as one large port would suffice, but I prefer two separate ports so as to increase the bearing that the valve has on its seat.

The length of the exhaust passageway 22 circumferentially considered, is such that when the valve is in the position that fluid is delivered from the inlet through the valve to the outlet 13, as shown in Fig. 3, the outlet 12 is placed in communication with the exhaust outlet 14 so that exhaust or drainage of the fluid being transmitted may take place from the outlet 12 to the exhaust 14 exteriorly of the inner chamber of the valve, and when the valve is turned to another operative position such that the other port 23 registers with the port 19 of outlet 12 so that the fluid is delivered from the inlet through the valve to the outlet 12, this exhaust passageway 22 connects the outlet 13 to the exhaust outlet 14, in which event pressure in the line extending from the outlet 13 is relieved by exhaust through the outlet 14.

This valve has three positions, one, a neutral or off position wherein both ports 23 are out of communication with the two ports 19, in which event the passageway 22 will communicate with the port leading to the exhaust outlet only. The second position is such as to connect the outlet 13 to the inlet, and at the same time to connect the outlet 12 to exhaust. The third position is such as to connect the outlet 12 to the inlet, and at the same time to connect the outlet 13 to exhaust.

The three-way valve embodying the principle of the four-way valve above described, involves simply a slight simplification in the structure, as appears from Fig. 4. In this instance the valve body here designated 24 has in addition to the inlet, now shown, simply two outlets 25 and 26, the outlet 25 being adapted to be connected to the part to which motive fluid is to be supplied, and corresponding with either of the outlets 12 and 13 of the first construction, and the outlet 26 being for exhaust. The valve here designated 27 is like that first described, except that it has simply one port 28 which is adapted to register with the port leading to the outlet 25, instead of two ports 23, as in the first construction. The arrangement of the port 28 with reference to the external exhaust passageway, here designated 29, and the throw of the valve, are such that when the valve is in "on" position the valve port 28 registers with the port leading to the outlet 25, in which event the fluid is delivered through the valve by the outlet 25, and the external passageway 29 is then idle, but when the valve is turned to "off" position the delivery port 28 of the valve is covered by the valve seat so that no flow of motive fluid takes place through the valve, and at the same time the external passageway 29 connects the outlet 25 to the exhaust outlet so as to relieve the pressure in the line which is connected to the outlet 25.

Having described my invention, I claim:

1. A four-way valve comprising a valve body having a valve seat, an inlet in line therewith, and three outlets, two being delivery outlets and the third being an exhaust outlet, a movable valve member engaging the seat and having an opening extending from one end into the same with lateral delivery means adapted to register with either of said delivery outlets when the valve is turned to different positions, and said valve having between its ends and external to said opening a circumferentially extending exhaust passageway adapted to connect the exhaust outlet to either delivery outlet when the other delivery outlet is connected by the lateral delivery means to the inlet of the valve.

2. A valve comprising a valve body having an inlet and a plurality of outlets, and having a valve seat opposite the inlet, a movable valve member engaging the seat and provided with an external circumferential passageway adapted to connect one outlet with the other when the said valve is in a certain position, said valve member also having an axially extending chamber open at one end toward the inlet and provided with a lateral port through which fluid may be delivered from the inlet to one of the outlets, said chamber being offset with reference to the axis of the valve member thereby providing space for said external passageway.

In testimony whereof, I hereunto affix my signature.

LOUIS W. GREVE.